April 29, 1958     G. W. JONSON     2,832,556
TRIPOD HEAD

Filed June 1, 1954     3 Sheets-Sheet 1

GUSTAVE W. JONSON,
INVENTOR.

BY Barlelow & Scantlebury
ATTORNEYS.

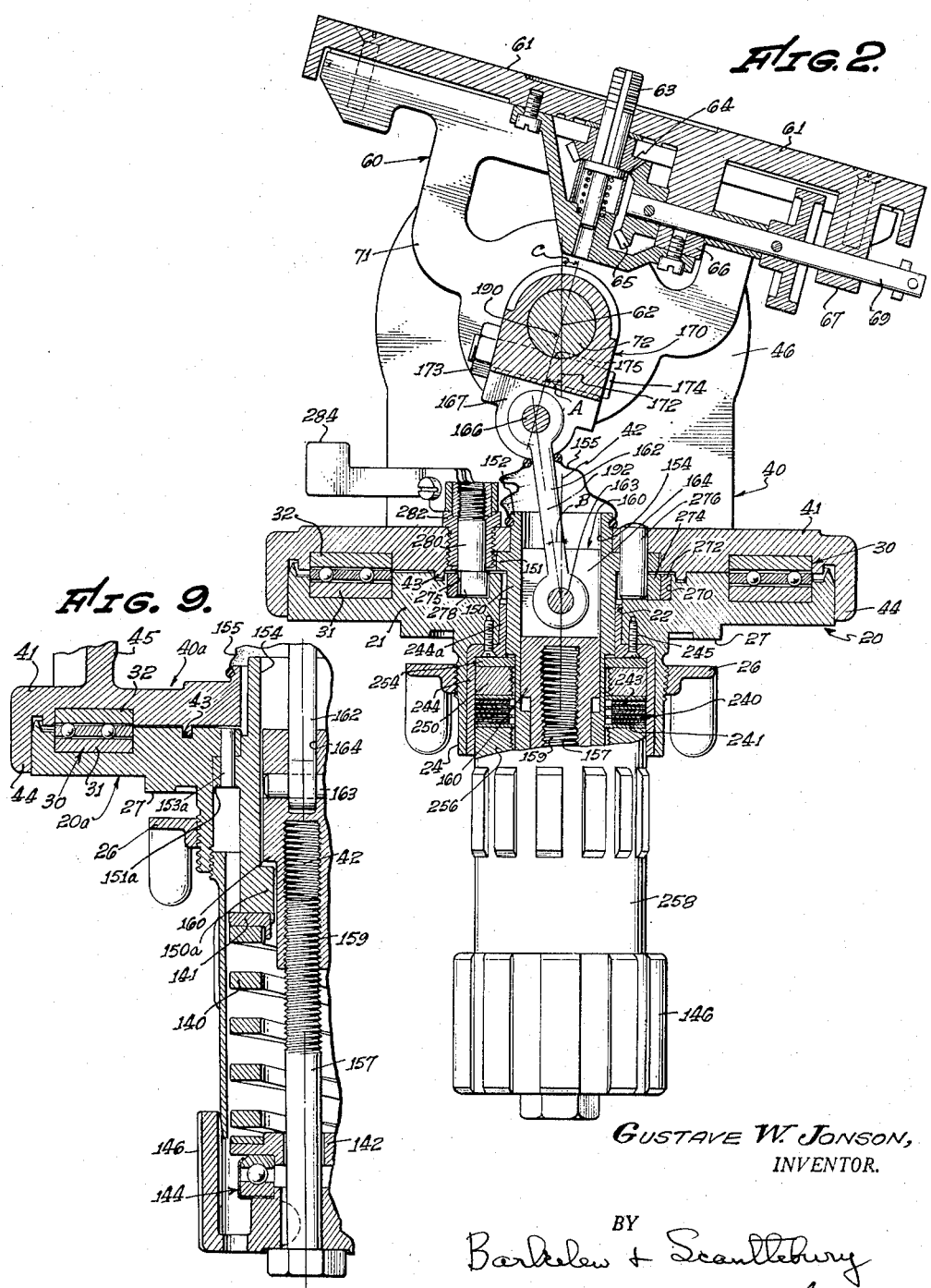

April 29, 1958      G. W. JONSON      2,832,556
TRIPOD HEAD

Filed June 1, 1954      3 Sheets-Sheet 3

GUSTAVE W. JONSON,
INVENTOR.

BY
Barkelew & Scantlebury
ATTORNEYS.

United States Patent Office 2,832,556
Patented Apr. 29, 1958

2,832,556

TRIPOD HEAD

Gustave W. Jonson, North Hollywood, Calif., assignor to Mitchell Camera Corporation, Glendale, Calif., a corporation of Delaware Application June 1, 1954, Serial No. 433,571

4 Claims. (Cl. 248—183)

This invention has to do generally with supporting structures, such as tripod heads, that include a base and a load supporting platform that is mounted on the base for rotational movement about one or more axes. Such tripod heads are commonly used for adjustably supporting cameras and other instruments.

Particularly in tripod heads intended for motion picture work, it is important that the movement of the platform with respect to the base be smooth and easily controlled. That movement is ordinarily of two types, "tilting" movement about a normally horizontal axis and "panning" movement about a normally vertical axis. A difficulty in providing smooth operation of the tilting movement results from the fact that the center of gravity of the loaded platform is ordinarily considerably above the horizontal tilt axis, so that gravity produces a torque about that axis that varies rapidly as the platform is tilted.

Many mechanisms have been proposed for counterbalancing such gravity-produced torque. Some of those mechanisms have been relatively successful in providing effective balance at one tilt position of the platform, or within a strictly limited range of the tilt movement. But movement beyond that range has produced a serious lack of balance that required continuous exertion of force by the operator to maintain the apparatus under control. To render such forces more manageable, it has been usual to provide a relatively stiff frictional force tending to prevent tilting movement of the platform. Such strong frictional force tends to make less critical the balancing force exerted by the operator at certain positions of the platform, but it also makes more difficult the smooth movement of the instrument at all positions.

The present invention avoids such difficulties, and permits smooth and convenient operation of a heavily loaded tripod with a minimum of frictional resistance. That is done by applying a counterbalancing force to the platform in such a way that the load is effectively balanced in all tilt positions. A yielding counterbalancing force is applied to the platform by mechanism that acts between the platform and the base and that acts on the platform at a point spaced from the tilt axis. The yielding force is applied to that point of the platform in a direction that is substantially fixed with respect to the base, regardless of the tilting movement of the platform. That force may be so determined that when the center of gravity of the loaded platform is directly above the tilt axis the line of application of the balancing force passes through that axis. The torque exerted on the platform is then zero. As the platform departs from that position, the same force continues to be applied at the same point of the platform and in substantially the same direction with respect to the base. But due to the rotation of the point of application about the tilt axis, the resulting torque varies in a manner to maintain uniform balance of the load.

The invention further includes particularly convenient means for adjusting the strength of the yielding force in accordance with different loading of the platform, for example to take account of instruments of different type.

A further aspect of the invention is the convenient compensation of variations in the position of the load on the platform. Many previous tripod head structures were capable of providing balance only if the center of gravity of the load happened to be located directly above the tilt axis when the platform was horizontal. The present invention provides convenient adjustment of the mechanism to compensate other positioning of the supported instrument on the platform. Subject only to the design limits of the apparatus, the compensating mechanism can be adjusted conveniently and quickly to take account of different loads and different placements of the load on the platform, and after such adjustment will fully balance the load in all tilt positions.

Alternatively, as may be preferred by certain operators or under certain conditions, the mechanism can be so adjusted as to require a predetermined application of force by the operator to maintain balance, that force being, if desired, uniform at all tilt positions of the mechanism.

A full understanding of the invention and of its further objects and advantages will be had from the following description of a preferred illustrative embodiment, reference being had to the accompanying drawings. That embodiment, however, is shown and described only for illustration, and the particulars of its construction may be altered in many ways without departing from the true scope of the invention, which is defined by the appended claims.

For example, the orientation of the device with respect to gravity is normally such that the pan axis is vertical and the tilt axis horizontal, and the present embodiment will be described for clarity in terms of that normal orientation. However, considerable variation from that normal orientation may be made without departing from the scope of the invention. In fact, an important advantage of the invention is the possibility of compensating variations of that type, as will be described.

In the drawings:

Fig. 2 is a vertical section on line 2—2 of Fig. 1, showing the tripod head somewhat tilted;

Fig. 9 is a fragmentary section corresponding to a portion of Fig. 1 and illustrating a modification.

Figure 1:
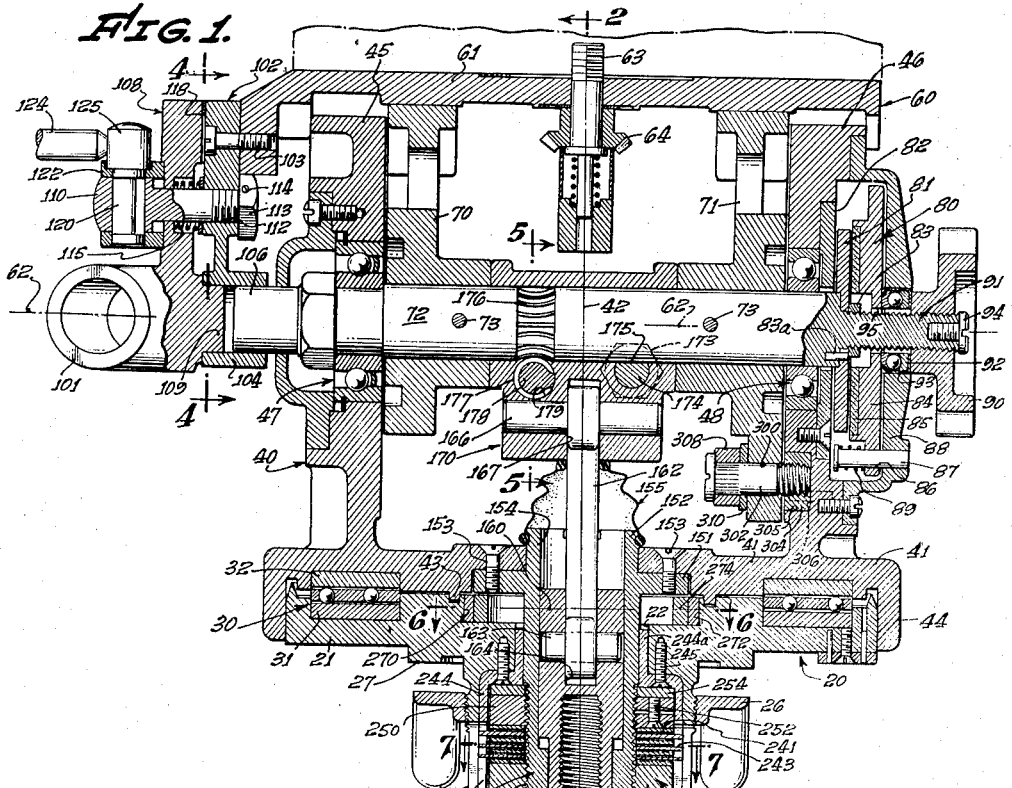
Fig. 1 is a vertical section through the intersecting tilt and pan axis.

As illustratively shown, the tripod head comprises a base 20; a frame 40, mounted on the base for relative rotation about pan axis 42, which is normally vertical; and platform 60, mounted on the frame for relative rotation about tilt axis 62, which is normally horizontal.

Base 20 comprises the horizontal circular plate 21, which is coaxial with pan axis 42 and is centrally bored at 22. A depending flange 24 coaxial with bore 22 and pan axis 42 is externally threaded to receive the clamp ring 26. The tripod head may be mounted on a tripod by clamping the top ring of the tripod (not shown) between clamping ring 26 and the flat annular face 27 of base plate 21.

Frame 40 includes a circular lower portion 41 which is rotatably supported on base plate 21 by means of the annular ball bearing 30. Bearing 30 comprises two annular races 31 and 32, which are received by grooves in the opposing faces of plate 21 and frame portion 41, respectively, concentric with pan axis 42. A sealing flange 43 depends from frame portion 41 and is fittingly but rotatably received in a groove in the upper face of plate 21. A depending peripheral flange 44 protects bearing 30 from dust. Two upstanding brackets 45 and 46 are fixed on frame plate portion 41 on opposite sides of pan axis 42, and carry the tilt bearings 47 and 48, respectively, which define the position of tilt axis 62 with respect to frame 40.

Platform 60 comprises a top plate 61, adapted to support a camera or other instrument and carrying a centrally located clamping screw 63 which is operable via the gears 64, 65 by manual rotation of the shaft 69, journalled in the brackets 66 and 67, which may be integral with top plate 61. Support brackets 70 and 71 depend from the lower face of top plate 61 and are so spaced as to be freely received between brackets 45 and 46 of frame 40. A platform shaft 72 is fixedly mounted in aligned horizontal bores in brackets 70 and 71, as by the pins 73. The opposite ends of shaft 72 extend beyond those brackets and are journalled in the bearings 47 and 48. Accordingly, those bearings provide a journal for the tilt movement of the platform with respect to frame 40.

That movement may be frictionally limited to an adjustable degree by the tilt friction clutch, indicated generally by the numeral 80. Friction clutch 80 comprises an axially fixed plate 81 which is fixedly mounted on shaft 72, as by the retaining nut 83 and the pin 83a, outwardly of bracket 46 and in spaced relation to the bearing retaining plate 82; and an axially movable plate 84 which carries a facing 85 of frictional material on its inner face in position to engage the outer face of plate 81. A housing plate 88 is fixedly mounted on the outer face of bracket 46 and forms with that bracket an enclosing protective housing for the clutch plates. A plurality of headed studs 87, fixedly set in the inner face of housing plate 88 parallel to shaft 72 and at points circumferentially spaced about tilt axis 62, are received freely by accurately fitting holes 86 in clutch plate 84. The studs 87 prevent rotation of clutch plate 84 about tilt axis 62, while permitting and guiding its axial translational movement. Coil springs 89 on the respective studs act between the stud heads and the inner face of plate 84 and yieldingly urge the clutch plates 81 and 84 out of frictional engagement. The end 91 of platform shaft 72 projects through a central clearance aperture 95 in clutch plate 84 and is threaded to receive friction adjusting knob 90. A thrust bearing 92 is received in an axial bore 93 in housing plate 88 and acts between the outer face of clutch plate 84 and the inner face of knob 90. A retaining screw 94, set firmly in the end of shaft 72, prevents accidental removal of knob 90 from the shaft.

In operation of the clutch, when the platform is swung about tilt axis 62, clutch plate 81 turns with the platform and clutch plate 84 remains rotationally fixed with respect to frame 40. Frictional force at the interface between the clutch plates therefore produces a drag upon such tilting movement. It is ordinarily desirable, particularly when the platform is fully counterbalanced, that that drag be relatively slight. The degree of the frictional force between clutch plates 81 and 84 is accurately controllable by axial adjustment of knob 90 on the threaded shaft extension 91, inward movement of the knob tending to clamp clutch plate 84 between plate 81, fixed on the shaft, and thrust bearing 92. During tilt movement of the platform, the friction of the threads between knob 90 and shaft 72 exceeds the friction of ball thrust bearing 92. The knob therefore turns with the platform, and its axial adjustment on shaft 72 is not disturbed.

Figure 3:
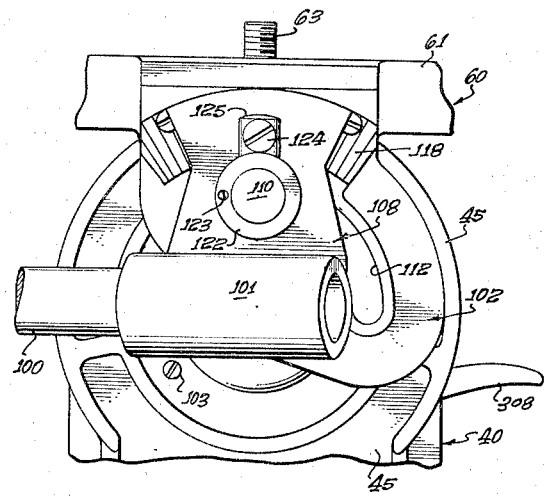
Fig. 3 is a fragmentary elevation in the aspect of Fig. 4.
Figure 4:
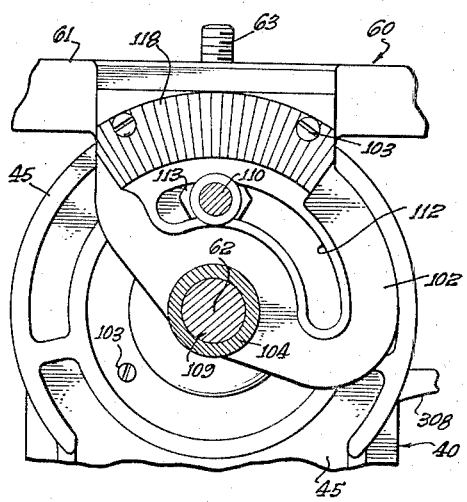
Fig. 4 is a section on line 4—4 of Fig. 1.

Movement of platform 60 is controlled by a relatively long handle 100, shown fragmentarily in Fig. 3, which is held rigidly but releasably in a handle socket 101 and extends generally radially with respect to tilt axis 62. Socket 101 is mounted on platform 60 in a manner that permits adjustment about the tilt axis. In the preferred structure shown, a handle bracket 102 is rigidly secured, as by the screws 103, to the left edge of top plate 61, as seen in Fig. 1, and extends downward across tilt axis 62, as shown best in Fig. 4. A guide sleeve 104 is formed in handle bracket 102 in position concentric with tilt axis 62. The inner end of sleeve 104 receives the end portion 106 of platform shaft 72. Shaft end 106, which is at the end of shaft 72 opposite to the clutch 80 already described, may fit sleeve 104 quite tightly, since both turn with the platform, and has the effect of greatly strengthening the handle bracket. Handle socket 101 is rigidly mounted on a socket bracket 108, with which it may be integral, as shown. Socket bracket 108 is provided with a boss 109, which is concentric with tilt axis 62 and which is rotatably received in the outer end of sleeve 104. That boss forms a pivot about which socket bracket 108 is rotatably adjustable with respect to handle bracket 102. That adjustable movement may be locked in any suitable manner. As shown, a locking stud 110 is slidably mounted in a bore in socket bracket 108 and is received by an arcuate slot 112 in handle bracket 102 concentric with tilt axis 62. The inner end of stud 110 is threaded to receive a retaining nut 113, which is locked in adjusted position, as by the set screw 114. The bore in socket plate 108 is preferably counterbored to receive the coil spring 115, which yieldingly urges plates 102 and 108 apart. Outward axial movement of stud 110 with respect to plate 108 draws the two plates together, clamping them effectively rigidly. That clamping action is preferably facilitated by mating of teeth 118, cut radially with respect to tilt axis 62 on the opposing faces of the respective plates. The clamping movement of stud 110 is preferably controlled by an eccentric 120, working in a crossbore in the head of stud 110 and journalled in a sleeve 122 which encloses the stud head and is rotatively fixed with respect to socket plate 108 as by the pin 123 (Fig. 3). Rotation of eccentric 120 is controlled by the handle 124, radially threaded into eccentric shaft 125. The throw of eccentric 120 is sufficient, aided by spring 115, to shift plates 102 and 108 between tightly clamped condition, with teeth 118 fully meshed, and spaced condition, with teeth 118 fully released. In the latter condition, handle 100 may be freely swung about tilt axis 62 with respect to platform 60 to any desired adjusted position within the range permitted by arcuate slot 112. In clamped position of the plates, handle 100 is effectively rigidly related to the platform, and is well adapted for controlling both tilt and pan movement of the platform with respect to base 40.

Means for counterbalancing the tilt movement of platform 60 in accordance with the invention will now be described in illustrative preferred form. The counterbalancing force is derived from a relatively heavy coil spring 140, shown typically as a compression spring, which extends coaxially with pan axis 42 between upper and lower spring washers 141 and 142. Lower spring washer 142 rests on a ball thrust bearing 144, which acts between the washer and the hand wheel 146, by which the spring tension is adjustable in a manner to be described. Upper spring washer 141 engages the lower end of a sleeve member 150. Sleeve member 150, which is preferably made of bronze, acts functionally as a downward extension of frame 40. It carries near its upper end an external flange 151 which engages a lower face of frame plate 41 and is rigidly fixed thereto as by the screws 153. Upward force from the upper end of compression spring 140 is thus transmitted to frame 40 via sleeve member 150. The upper end of member 150 preferably projects above the level of frame base plate 41, as shown at 152, and is externally grooved to receive the lower end of a flexible dust shield 155, the upper end of which tightly encloses the shank of link 162, to be described.

The inner wall of sleeve member 150 forms a cylindrical bore 154 coaxial with pan axis 42, in which a slider 160 is freely slidable and rotatable. Slider 160 is connected on the one hand to tension control wheel 146 by the spindle 157, and on the other hand to platform shaft 72 by means of the connecting link 162 and crank member 170. Spindle 157 extends along pan axis 42, is keyed at 158 to wheel 146 and is axially threaded at 159 into the lower end of slider 160. Link 162 is pivoted by the transverse pivot pin 163 in a diametral slot 164 in the upper end portion of slider 160; and is pivoted by the crank pin 166 in a slot 167 in the crank member 170. Crank member 170 is rigidly, but preferably adjustably, mounted on platform shaft 72 between brackets 70 and 71, with crank pin 166 parallel to that shaft and offset from tilt axis 62.

Figure 5:
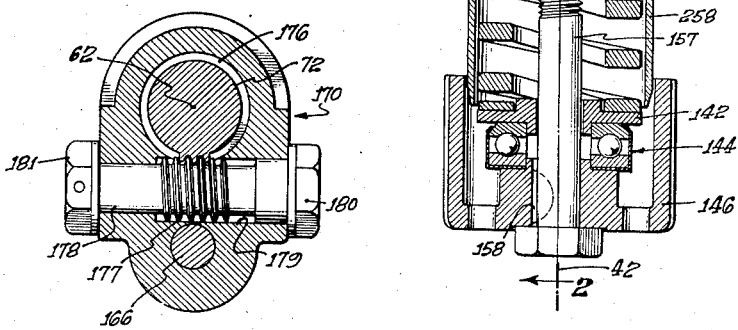
Fig. 5 is a section on line 5—5 of Fig. 1.

Crank member 170 may be releasably clamped to shaft 72 by the nut 173 on transverse stem 174 (Fig. 1), which is cylindrically notched at 175 to receive the shaft. Release of nut 173 permits rotational adjustment of crank member 170 about shaft 72. As illustratively shown in Fig. 2, that adjustment is such that crank axis 190 is normal to the surface of platform 61. A particularly convenient and economical means for adjusting the relative rotational positions of crank member 170 and shaft 72 is illustratively shown in the drawings. Worm teeth 176 are cut directly in the surface of shaft 72, and a worm gear 177 is formed on a short shaft 178, journalled in a transverse bore 179 in crank member 170 (Figs. 1 and 5). Worm gear shaft 178 is provided at its ends with formations, shown as the hexagonal head 180 and the pinned nut 181, by which it can be gripped by a tool for rotational adjustment. When clamp nut 173 is released, rotation of shaft 178 and worm 177 causes crank member 170 to swing about the fixed platform shaft 72, carrying crank pin 166 into any desired relative rotational position with respect to the platform itself. Worm 177 effectively locks the crank member in any such adjusted position, but it is preferred to supplement that locking action by again tightening clamping nut 173. Alternatively, the worm and worm gear structure shown may be replaced by a second clamping stem similar to 174. Adjustment may then be made by first releasing both clamp nuts, disabling the counterbalancing system. The force of spring 140, acting through link 162, then swings crank member 170 about shaft 72, bringing crank axis 190 into alignment with pan axis 42. Shaft 72 may then be rotated to the desired position relative to crank member 170 by tilting the entire platform by means of tilt handle 100. The crank member is then clamped in its adjusted position, restoring the counterbalancing system to operation.

Rotation of control wheel 146, for example to the right as grasped from below, threads spindle 157 axially into slider 160. For any given position of the slider in its guideway 154, that movement compresses spring 140, which thereupon exerts an upward yielding force upon sleeve 150. That force is transmitted through the structure of frame 40 and tilt journal bearings 47 and 48 to platform shaft 72. An equal downward yielding force is exerted upon slider 160 and is transmitted via link 162 to crank pin 166. The downward force on crank pin 166 and the upward force on shaft 72 comprise a couple tending to swing the shaft relative to frame 40 into position with crank axis 190 in the plane defined by platform shaft 72 and slider pin 163. That plane is normal to Fig. 2 at pan axis 42. Thus with the parts in the typical position of Fig. 2, compression of spring 140 tends yieldingly to swing platform 60 counterclockwise about tilt axis 62, in a direction to reduce angle A and to restore top plate 61 toward horizontal position.

The resulting torque applied to platform 60 is proportional to the degree of compression of spring 140, and is approximately proportional to the sine of the angle shown at A in Fig. 2, between pan axis 42 and crank axis 190. The torque also depends upon the angle B, between pan axis 42 and the axis 192 of link 162. However, particularly if the link is relatively long compared to the crank arm (the radial distance from tilt axis 62 to crank pin 166), that dependence is relatively slight and may be neglected for most practical purposes. Furthermore, spring 140 is preferably of such strength that it is used under appreciable compression. The change in its degree of compression as the platform swings about tilt axis 62 is then relatively slight, and the spring force, for most practical purposes, may be considered to depend only upon the adjustment of hand wheel 146 and to be substantially independent of the position of the platform. The torque exerted upon the platform by the compensating mechanism is therefore substantially proportional to sin A. That is, the counterbalancing torque T is given substantially by:

$$T = K \sin A \qquad (1)$$

where K is a proportionality factor. The value of K depends primarily upon the length of the crank arm, which in the present embodiment is fixed, and the tension of spring 140, which adjustably variable.

Figure 8:
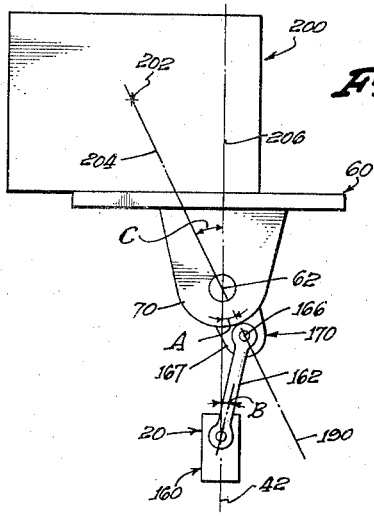
Fig. 8 is a schematic diagram, illustrating operation of the invention.
Figure 6:
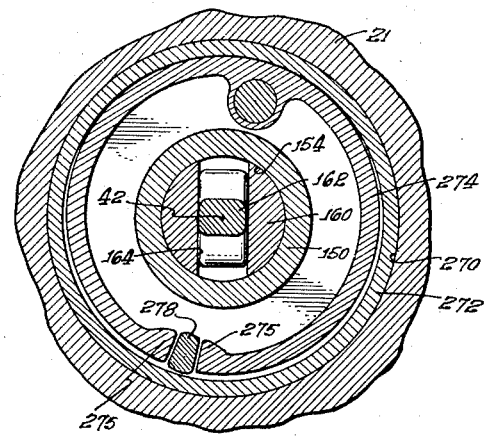
Fig. 6 is a horizontal fragmentary section on line 6—6 of Fig. 1.

On the other hand, the torque that is required to balance a load supported on the tripod platform depends upon both the platform angle and the position of the center of gravity of the load with respect to the platform. Referring to Fig. 8, the platform is shown schematically at 60 in horizontal position, with tilt axis at 62. A load is indicated at 200 mounted on the tripod platform in such typical position that its center of gravity 202 is not directly above tilt axis 62, but lies to the left of that axis. Center of gravity 202 lies on a radius 204 with respect to tilt axis 62 that forms an angle C with vertical 206. Center of gravity 202 may be considered to represent the center of gravity of the combined assembly of load 200 and platform 60; but since in practice the platform is much lighter than the load and also closer to tilt axis 62, it is usually sufficient in practice to consider only the center of gravity of the load itself. That load may, for example, comprise a motion picture camera contained in a sound insulated housing or blimp, and may include accessories such as special lenses, sun shield and the like. If M represents the weight of the described parts having center of gravity at 202, the torque $t$ due to gravity and tending to swing the platform about tilt axis 62 is given by:

$$t = M \sin C \qquad (2)$$

Equation 2 continues to hold as angle C varies in response to tilt movement of the platform away from the horizontal position illustrated.

In accordance with the present invention, the rotational position of crank member 170 on shaft 72 is preferably so adjusted, as by the described manipulation of worm 177, that the angle A between crank axis 190 and the direction of action of spring 140 is equal to angle C. In the present embodiment, spring 140 acts along pan axis 42, which is normally vertical. Hence angle A may ordinarily be made equal to angle C by setting crank axis 190 at 180° from the radius 204. Handwheel 146 is then adjusted until the tension of spring 140 substantially corresponds to the weight M of the load, in the sense that K in Equation 1 is substantially equal to M in Equation 2. Since angles A and C are equal, the two described adjustments lead to the relation $$t = T \qquad (3)$$

Since that relation is substantially independent of the tilt angle, the load is effectively balanced in all tilt positions of the platform. That relation holds in spite of the offset position of the center of gravity of the load on the platform.

The presently described structure represents a particularly effective arrangement of parts whereby gravitational torque on the tripod platform is balanced by providing a yielding force between platform member 60 and frame member 40. That force acts upon a formation (typified by crank pin 166) that is rigidly mounted on one of those members in eccentric position with respect to the tilt axis; and the force acts on that formation in a direction that is substantially constant with relation to the other member. That direction of action need not necessarily be along pan axis 42, as in the present embodiment, although that relation provides distinct advantages. Nor is it necessary that the eccentrically mounted formation be mounted on platform member 60 rather than on frame member 40. The primary condition for effective operation is that the angle between the crank axis and the direction in which the yielding force is applied to the eccentric formation (angle A) be equal to the angle between the vertical and the radius drawn from the tilt axis to the center of gravity of the load (angle C).

From the preceding description it will be seen that the force of spring 140, which in practice may be several hundred pounds, is taken by the journal bearings 47 and 48 which provide the tilt movement. However, that force is not taken by the bearings that provide pan movement, shown illustratively as the ring bearing 30, since in the described embodiment sleeve 150, which receives the upward thrust from the upper spring end, transmits that thrust directly to frame base 41.

Fig. 9 illustrates a modification in which the sleeve member 150a, corresponding to sleeve 150 of the previous embodiment, forms a rigid portion of base 20a rather than of frame 40a. As shown, sleeve 150a carries an external flange 151a which seats against a lower face of base 20a, and is rotatively fixed thereto, as by the pin 153a. Other elements of the modified structure may be closely similar or identical to those already described, as indicated by their designation in the drawings by the same respective numerals. Some elements of the previous embodiment, including in particular the pan clutch 240 to be described, are omitted for clarity of illustration in the modification of Fig. 9, but may be provided, with suitable modifications, if desired.

Operation of the modification of Fig. 9 is in many respects similar to that of the previous form, and need not be described in detail. It is noted, however, that panning movement of the tripod head causes rotation of slider 160 with respect to its guiding cylindrical sleeve 150a; for the sleeve is rotatively fixed to base 20a, and slider 160 is constrained by link 162 to rotate about pan axis 42 with crank member 170 (Fig. 1), and hence with frame 40a. However, such rotation is freely permitted by the described cylindrical form of slider 160 and its guiding sleeve 150a, and is further facilitated by the thrust bearing 144 for spring 140.

In the previously described embodiment, relative rotation of slider 160 and sleeve 150 does not take place. The guiding action of sleeve 150 does not then require the cylindrical form shown, although that form may be preferred for such reasons as economy and convenience. The particular type of guide structure shown is to be considered illustrative of any structure providing the described function. In the form of Fig. 9, however, slider 160 is necessarily guided by a structure of some type that permits not only relative translation along pan axis 42, but also relative rotation about that axis. The cylindrical guide structure shown is a preferred type of structure performing that described function.

Figure 7:
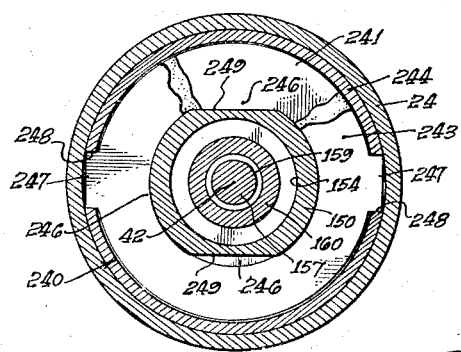
Fig. 7 is a horizontal section on line 7—7 of Fig. 1.

A particular advantage of the illustrative embodiment of Figs. 1 to 7 is the unusually convenient and effective manner of providing frictional braking and positive locking of the panning movement. As illustratively shown, a panning friction clutch 240 comprises a plurality of annular clutch plates of alternating types 241 and 243, keyed respectively to an inner clutch sleeve, shown as sleeve 150, that rotates with frame 40, and to an outer slotted clutch sleeve 244 that is rotatively fixed to base 20. Washers of fibre or other material may be inserted between adjacent clutch plates if desired, to increase the friction. Fig. 7 is a section taken just above one of the plates 243, which is keyed by engagement of the external ears 247 in axial slots 248 in outer clutch sleeve 244. Plate 243 is broken away at the top of Fig. 7 to show a plate 241 of the other type, keyed by engagement of the straight inner edge portions 246 with the flatted faces 249 of sleeve 150. As shown, outer clutch sleeve 244 fits snugly within the depending sleeve portion 24 of base 20. It is rigidly secured to base 20, as by the screws 245. Sleeve 244 has an upper portion 244a of reduced diameter, which is received by the bore 22 in base plate 21 and which fittingly receives and guides the intermediate part of sleeve 150.

The lower portion of sleeve 150 is externally threaded at 242, and a clamp ring 250 is carried by those threads above the clutch plates 241 and 243 in a position that is threadedly adjustable and that may be locked as by the clamp screw 252. Clamp ring 250 with the washer 254 then prevents separation of base 20 and frame 40 at the ring bearing 30. Clamp ring 250 also serves as an upper seat for the assembly of clutch plates 241 and 243. The clutch plates are adjustably pressed against that seat by the lower ring 256, which is threaded on sleeve 150. Ring 256 is conveniently rotatable for adjustment by means of the integral depending control sleeve 258, which serves also as a protective housing about spring 140. Sleeve 258 is coaxial with pan axis 42, and hence also with control wheel 146, already described. Control sleeve 258 is long enough to provide a firm grip upon its surface without affecting control wheel 146; and yet, because of its coaxial relation and substantial uniformity of size with that wheel, both control elements can conveniently be grasped and turned together when desired. It has been found that the close proximity and coaxial relation of the two manual controls 146 and 258 greatly facilitate rapid and accurate adjustment of the degree of compensation of the tilt movement and of the frictional limitation of the pan movement.

Effectively positive locks are preferably provided for both tilt and pan movements. An illustrative preferred locking means for the pan movement is shown best in Figs. 2 and 6. A circular well 270 is formed in the upper face of base plate 21 coaxial with pan axis 42, and receives the press-fitted lining ring 272. Within ring 272 is a split locking ring, the midpoint of which is pinned by the pin 276 to frame base 41, so that it rotates with respect to base 21 in response to panning movement. Between the spaced ends 275 of actuating ring 274 is a cam 278, which is fixed on a shaft 280, journalled in a bushing 282 set in frame base 41. Cam shaft 280 is controlled by a pan lock handle 284, rotation of which spreads ring 274, applying friction between the tripod frame and base. Cam 278 may be formed to pass over center, providing detent action when in locking position.

An illustrative preferred type of friction lock for the tilt movement is illustrated in Figs. 1 and 3. An arcuate slot 300, which is formed in the wall of bracket 71 of platform 60, has tilt axis 62 as its axis of curvature and extends through a sufficient angular range to accommodate whatever tilting movement is required. A stub shaft 302 passes freely through that slot, and its inner end is threaded into a circular nut 304, which is set in a closely fitting well 305 in the face of bracket 46 of the tripod frame. Nut 304 is free to move axially in the well, but rotation is prevented, as by a pin indicated at 306. Rotation of shaft 302 is controlled by a tilt lock handle 308, fixedly mounted on its outer end. The end of handle 308 is visible in Fig. 3. Tilting movement necessarily involves sliding movement of shaft 302 along arcuate slot 300 in bracket 71. A friction washer 310 is mounted on shaft 302 between handle 308 and the face of bracket 71. Rotation of the shaft in response to handle movement threads the inner end of the shaft into nut 304, drawing the nut toward washer 310 and effectively clamping bracket 71 against tilting movement with respect to bracket 46. Although shaft 302 is shown in the plane of Fig. 1 for convenience of illustration, it may be positioned at any convenient point about the tilt axis. A friction lock of the type described provides remarkably smooth action with no measurable backlash, since nut 304 can readily be made to fit well 305 with the required precision.

I claim:

1. A tripod head comprising a supporting structure having a fixed base and a frame member mounted on the base for rotation about a normally vertical pan axis, a load supporting platform journaled on said structure on a normally horizontal axis for tilting in a normally vertical plane about that axis, said platform being directly journaled on the frame member on the normally horizontal tilting axis, the vertical pan axis, prolonged, intersecting the tilting axis, a slider, guide means for the slider on said supporting structure guiding the slider along a line of movement radial of said tilting axis, the slider being radially spaced from said tilting axis, the guide means for the slider being mounted directly on the base below the tilting axis and the line of slider movement coinciding with the vertical pan axis, yielding means urging the slider in a direction radially away from the tilting axis, means associated with the platform and carrying a crank pin on an axis parallel to the tilting axis and radially spaced from the tilting axis toward the slider, and a connecting tension link extending between and pivotally connected at opposite ends to the crank pin and the slider.

2. The tripod head defined in claim 1 and in which the means carrying the crank pin is angularly adjustable on the platform about its tilting axis, whereby to adjustably set the angular relation of the platform and the radial spacing line of the crank pin.

3. The tripod head defined in claim 2 and in which the length of connecting link between its terminal pivotal connections is approximately at least twice the radial spacing of the crank pin from the tilting axis.

4. The tripod head defined in claim 1 and in which the length of connecting link between its terminal pivotal connections is approximately at least twice the radial spacing of the crank pin from the tilting axis.

References Cited in the file of this patent

UNITED STATES PATENTS

| | | |
|---|---|---|
| 424,834 | Swan | Apr. 1, 1890 |
| 1,126,720 | Debrie | Feb. 2, 1915 |
| 1,211,895 | Theiss | Jan. 9, 1917 |
| 1,386,025 | Pittman | Aug. 2, 1921 |
| 1,962,548 | Zerk | June 12, 1934 |
| 2,204,013 | Gaidos | June 11, 1940 |

FOREIGN PATENTS

| | | |
|---|---|---|
| 539,084 | Great Britain | Aug. 27, 1941 |